(12) United States Patent
Thusoo et al.

(10) Patent No.: US 6,389,519 B1
(45) Date of Patent: May 14, 2002

(54) METHOD AND APPARATUS FOR PROVIDING PROBE BASED BUS LOCKING AND ADDRESS LOCKING

(75) Inventors: Shalesh Thusoo, Milpitas; Niteen Patkar, Sunnyvale, both of CA (US)

(73) Assignee: ATI International SRL, Barbados (VG)

( * ) Notice: Subject to any disclaimer, the term of this patent is extended or adjusted under 35 U.S.C. 154(b) by 0 days.

(21) Appl. No.: 09/356,732

(22) Filed: Jul. 19, 1999

(51) Int. Cl.[7] .............................................. G06F 13/00
(52) U.S. Cl. ..................... 711/152; 711/201; 710/200
(58) Field of Search ................................ 710/108–109, 710/119–125, 240–243, 200; 711/152, 201; 712/204

(56) References Cited

U.S. PATENT DOCUMENTS

| | | | |
|---|---|---|---|
| 5,185,865 A | * 2/1993 | Pugh ........................... | 710/108 |
| 5,787,486 A | * 7/1998 | Chin et al. ................... | 711/163 |
| 5,797,026 A | * 8/1998 | Rhodehamel et al. ....... | 711/146 |

* cited by examiner

Primary Examiner—Matthew Kim
Assistant Examiner—Denise Tran
(74) Attorney, Agent, or Firm—Vedder, Price, Kaufman & Kammholz (57) ABSTRACT

A method and apparatus for both facilitating access to shared memory addresses over a common bus by a plurality of data processors includes detecting, by at least a first processor, that two access addresses are boundary addresses on either side of an address boundary. The method and apparatus locks the common bus in response to detecting the two access addresses. In addition, the method and apparatus locks the two detected addresses based on address probe inquiry data communicated by the first processor. Accordingly, at least one processor employs probe based bus lock and address lock control to facilitate efficient access to shared memory addresses. Preferably, each processor includes probe-based bus lock and address locking control. The method and apparatus provides a type of address locking with deterministic bus locking when needed.

28 Claims, 7 Drawing Sheets

METHOD AND APPARATUS FOR PROVIDING PROBE BASED BUS LOCKING AND ADDRESS LOCKING

FIELD OF THE INVENTION

The invention relates generally to a method and apparatus employing multiple processors, and more particularly to a method and apparatus for facilitating access to shared memory addresses over a common bus by a plurality of data processors.

BACKGROUND OF THE INVENTION

Multiprocessor systems are well known. For example, a multimedia computer system may have a plurality of data processors such as a host processor, a graphics and video processor, and other processors. These processors may be on the same or separate chips and may share one or more buses. A problem arises with systems employing multiple processors when the multiple processors need to access shared memory addresses over a common bus. If the processors are not properly controlled, one processor may overwrite data in an address that is being accessed by another processor prior to the second processor finishing use of the data at the address.

One solution has been to employ address locking. In such systems, addresses are locked so that only one processor at a time can read or write to a given address. For example, when a processor needs to read data that is stored in a particular address, the processor needing access to the address may send a command to a host processor or other device to lock the address so that no other processors can access the address until the processor needing access has completed its task. However, a problem can arise with systems that use unaligned addressing structures. For example, when a processor needs to read data that is stored in misaligned addresses, the processor typically has to perform two separate transactions to complete the address lock transaction. During this time, another processor can lock the needed address when the address is on the boundary. This is typically because the processor can only read memory addresses that are aligned to an eight byte boundary, for example. Accordingly, a different solution has been implemented, sometimes referred to as bus locking.

With bus locking, a processor locks the bus to prevent other processors from accessing a desired address. However, bus locking can be inefficient since other processors cannot complete their tasks until the processor that has locked the bus has unlocked the bus. This can result in hundreds of cycles being lost. This becomes a greater problem when real time interrupts are being used such as in the case of multimedia processors that process video data, audio data and other real time data. For example, a processor that is processing real time audio may drop audio or video frames if the bus is locked for a larger period of time than suitable overflow buffers can accommodate.

Consequently, there exists a need for a method and apparatus for facilitating access to shared memory addresses, over a common bus, by a plurality of data processors that overcomes one or more of the above-mentioned problems.

BRIEF DESCRIPTION OF THE DRAWINGS

The invention will be more readily understood with reference to the below-identified drawings, wherein.

DETAILED DESCRIPTION OF A PREFERRED EMBODIMENT OF THE INVENTION

Briefly, a method and apparatus for facilitating access to shared memory addresses over a common bus by a plurality of data processors, which includes detecting, by at least a first processor, that two access addresses are boundary addresses on either side of an address boundary. The method and apparatus locks the common bus in response to detecting the two access addresses. In addition, the method and apparatus locks the two detected access addresses based on address probe inquiry data communicated by the first processor. Accordingly, at least one processor employs probe based bus lock and address lock control to facilitate efficient access to shared memory addresses. Preferably, each processor includes probe-based bus lock and address locking control. The method and apparatus provides a type of address locking with deterministic bus locking when needed.

The method and apparatus sends address probe inquiry data to other processors, such as bits in an instruction indicating whether addresses on an address boundary are available. The method and apparatus locks the bus for a maximum of a pipeline length of an instruction pipeline, such as seven cycles or less, then the inquiring processor generates another probe inquiry request so that the bus is not locked for extended cycles.

In one embodiment, the method and apparatus generates, the address probe inquiry data for each of the two detected addresses on either side of the address boundary, wherein the address probe inquiry data includes data representing an inquiry for the second processor of whether at least one of the two boundary addresses for the first processor of a boundary address can be available for the first processor. In other words, the first processor probes one or more processors to determine if the address on the other side of the address boundary is intended to be used by one of the other processors. If the probe is successful, the inquiring processor locks the boundary addresses. The bus lock is removed when the address lock is removed for both boundary addresses. In another embodiment, the instruction pipeline of a second processor is stalled, under control of the inquiring processor, in response to locking the bus.

Figure 1:
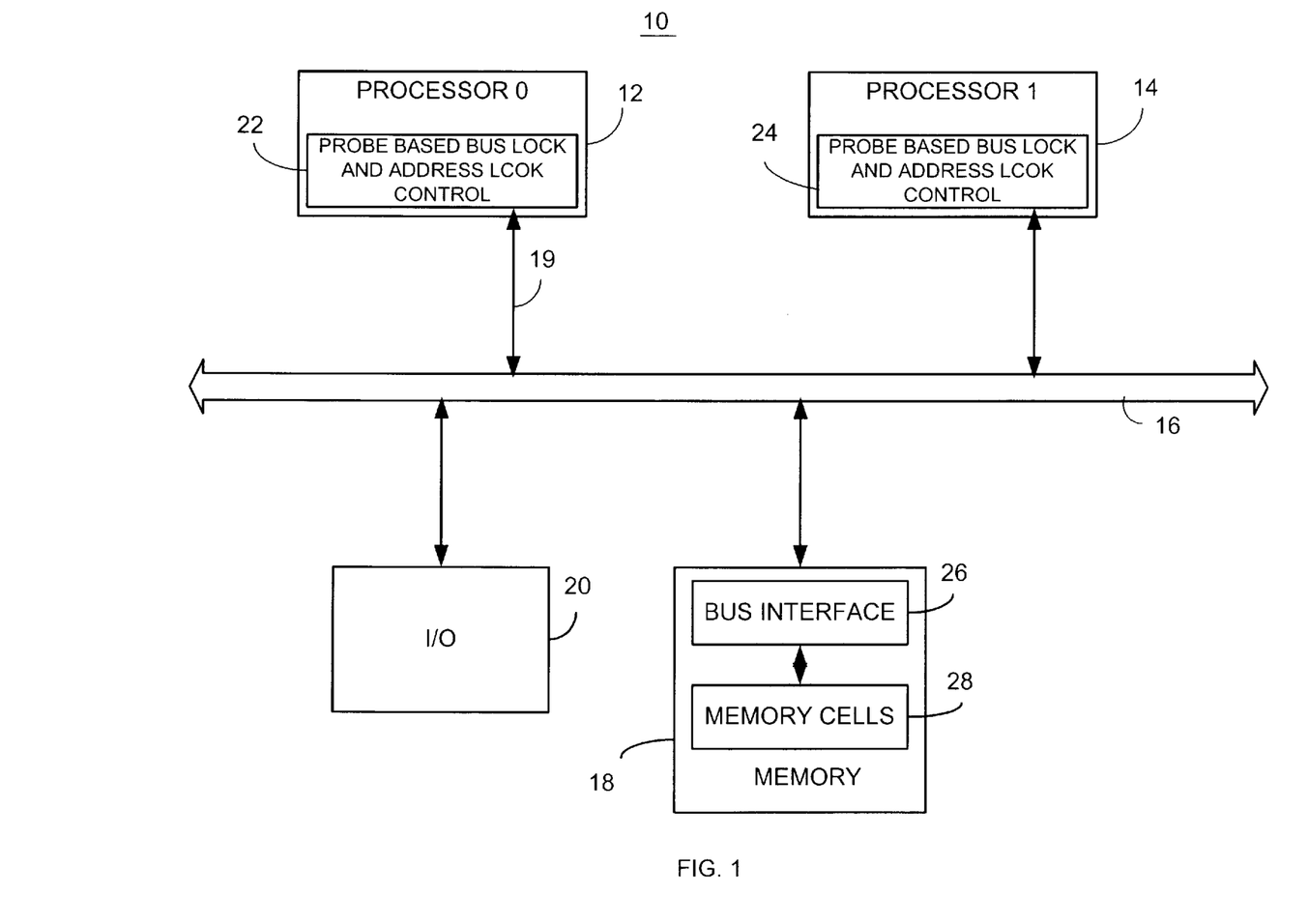
FIG. 1 is a block diagram illustrating one embodiment of an apparatus for facilitating access to shared memory addresses over a common bus which employs probe-based bus lock and address locking control for each of a plurality of processors in accordance of one embodiment of the invention.

FIG. 1 shows a multi-processor configuration 10 having a first processor 12, a second processor 14, a common bus 16, shared memory 18, and other input/output processors 20. For purposes of illustration, the invention will be described in connection with a system employing data processors in the form of multimedia processing units, however, it will be recognized that any suitable processors that share a common memory may also benefit from the disclosed invention. As such, processor 12 may be, for example, a processing unit that performs multimedia application based processing. In addition, the processor 14 may be a substantially similar type multimedia based processor that performs operations, such as video, audio and graphic data processing. The shared memory may be any suitable memory, for example, DRAM, SGRAM, ROM or any other suitable memory. The common bus 16 may be any suitable bus, and for purposes of illustration will be a pipeline split transaction bus, as known in the art, that may, for example, allow reading of 64 bits in any one cycle. However, it will be recognized that any suitable bus may also be used.

In this embodiment, each of the processors 12 and 14 includes probe based bus lock and address lock control logic 22 and 24, respectively. This logic circuitry may be incorporated as part of bus interface logic or any other suitable logic. In addition, it will be recognized that the probe based bus lock and address lock control logic 22 and 24 may be implemented in any suitable manner, including, but not limited to, hardware, firmware, or any suitable combination thereof. The memory 18 may be any suitable memory which includes, as known in the art, bus interface logic 26 to suitably interface with the common bus 16 and memory cells 28 that store data. The probe based bus lock and address control logic 22 and 24 provides a mechanism for address locking with deterministic bus locking. The logic 22 and 24 serves as a type of address based bus locking as further described below.

The probe based bus lock and address lock control logic 22 and 24 detects that, for example, two access addresses desired to be accessed by processor 12 are boundary addresses on either side of an address boundary. The probe based bus lock and address lock control logic 22 locks the bus in response to detecting the two access addresses and locks the two detected addresses based on address probe inquiry data communicated for the processor 14. Bus locking is performed in one example, by stalling the instruction pipeline for all other processors.

Figure 2:
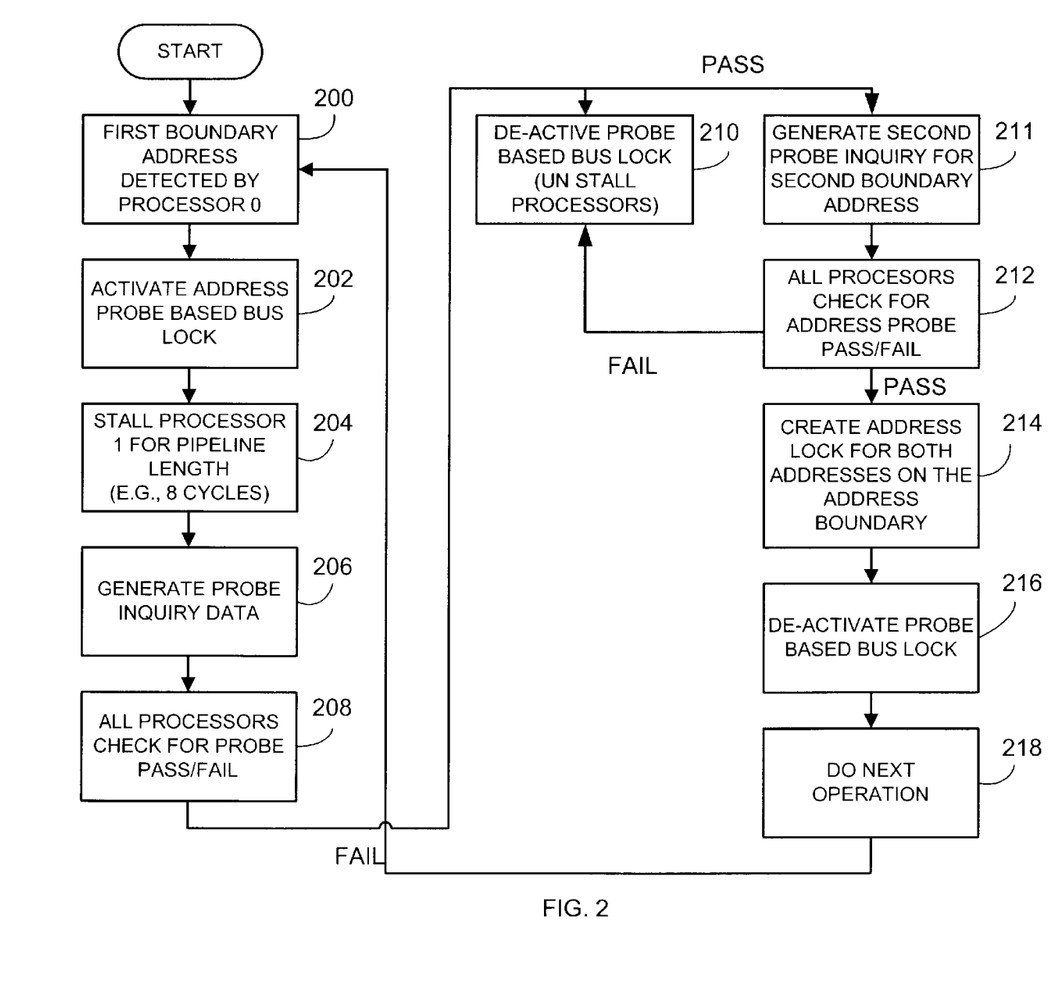
FIG. 2 is a flow chart illustrating one example of the operation of the system shown in FIG. 1 in accordance with one embodiment of the invention.

As shown in FIG. 2, the processor 12 detects that two access addresses are boundary addresses on either side of an address boundary as shown in block 200. As shown in block 202, if the addresses are boundary addresses, the process includes activating probe-based bus locking. This entails locking the bus in response to detecting the two access addresses. As shown in block 204, this includes, in this embodiment, stalling the processor 14 for approximately 8 cycles by stalling an instruction pipeline. This serves as a bus lock determined based on whether an access address is on a boundary address.

As shown in block 206, the process includes generating address probe inquiry data 19, such as for a first boundary address, over a common bus 16. The first boundary address may be a higher memory address than a second boundary address that has a lower memory address. However, any suitable order may be used. This includes generating address probe inquiry data that includes data representing an address to be probed and data representing an inquiry as to whether the address to be probed is available for future use by the first processor. As shown in block 208, all processors check for a probe pass/fail condition. This is done, for example, where the address probe inquiry data includes data representing an inquiry for another process or whether at least one of the two boundary addresses for the first processor is available. For example, where a processor determines that the address indicated in the probe inquiry data is going to be used, it would indicate that the probe has failed since the address would be accessed by another processor other than the one probing. As such, as shown in block 210, if any of the processors indicate that the probe has failed, the first processor will deactivate the probe based bus lock and unstall the other processors. However, if the other processors do not indicate that the first address on the boundary is going to be used, the processor then generates a second probe inquiry as shown in block 210 for the second address in the group of two boundary addresses. Again, all processors determine whether the probe will pass or fail as indicated in block 212. Again, if all processors indicate that they will not be using the second address of the two address boundaries, the process continues in block 214 by the first processor creating an address lock for both boundary addresses. This includes locking the two detected access addresses based on the address probe inquiry data communicated by the first processor. The address locking is done, for example, by storing the two addresses by the inquiring processor (or by a non-inquiring processor if desired) and setting a lock address bit.

As shown in block 216, after the address lock is created, the process continues by deactivating the probe based bus lock, while maintaining the address lock, so that the other processors may continue performing their tasks while the address lock is still maintained for those boundary addresses. The process includes removing the bus lock when the address lock is removed for both boundary addresses. As shown in block 218, the processor then continues to the next operation.

Figure 3:
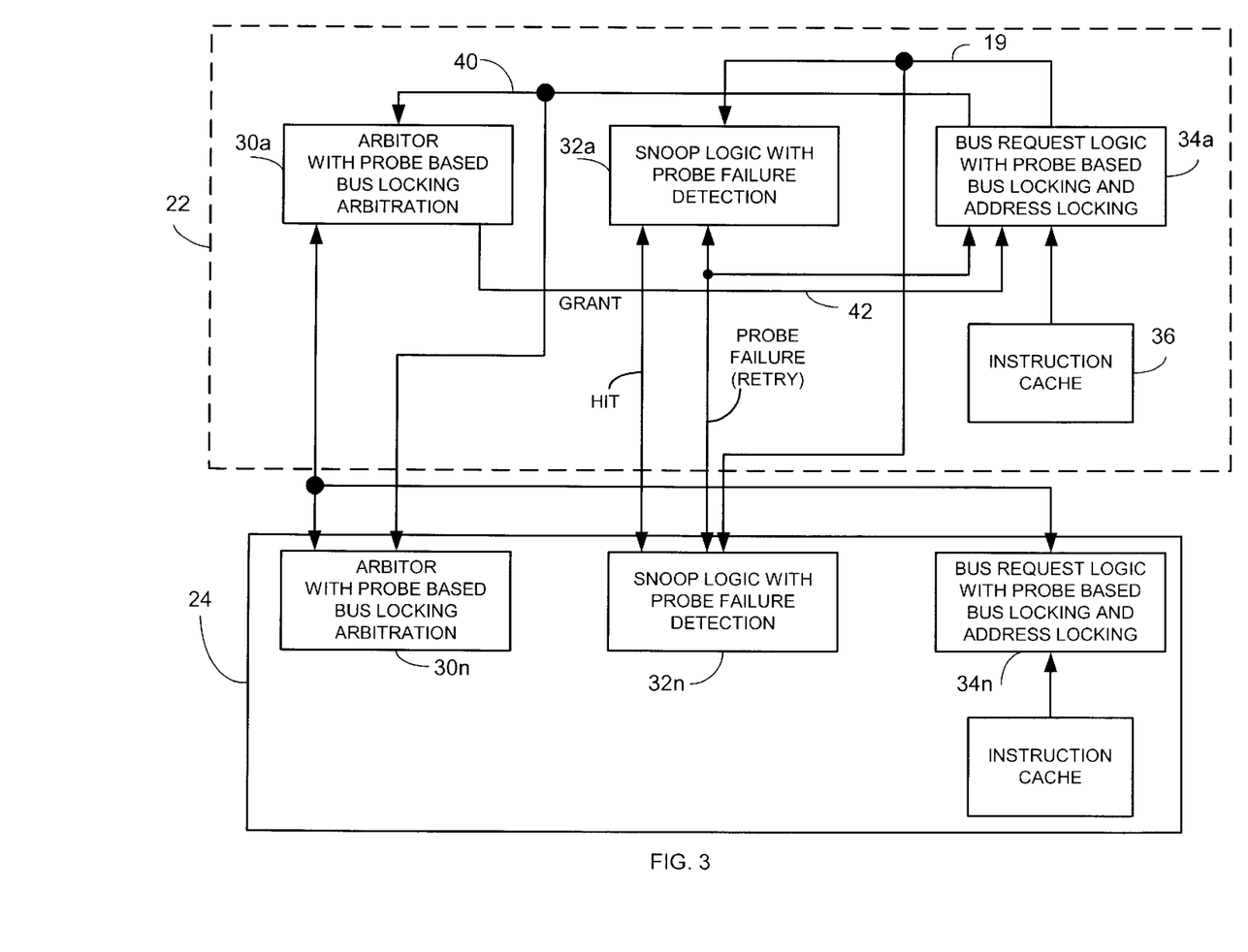
FIG. 3 is a block diagram illustrating one example of the probe-based bus lock and address lock control apparatus shown in FIG. 1.
Figure 4:
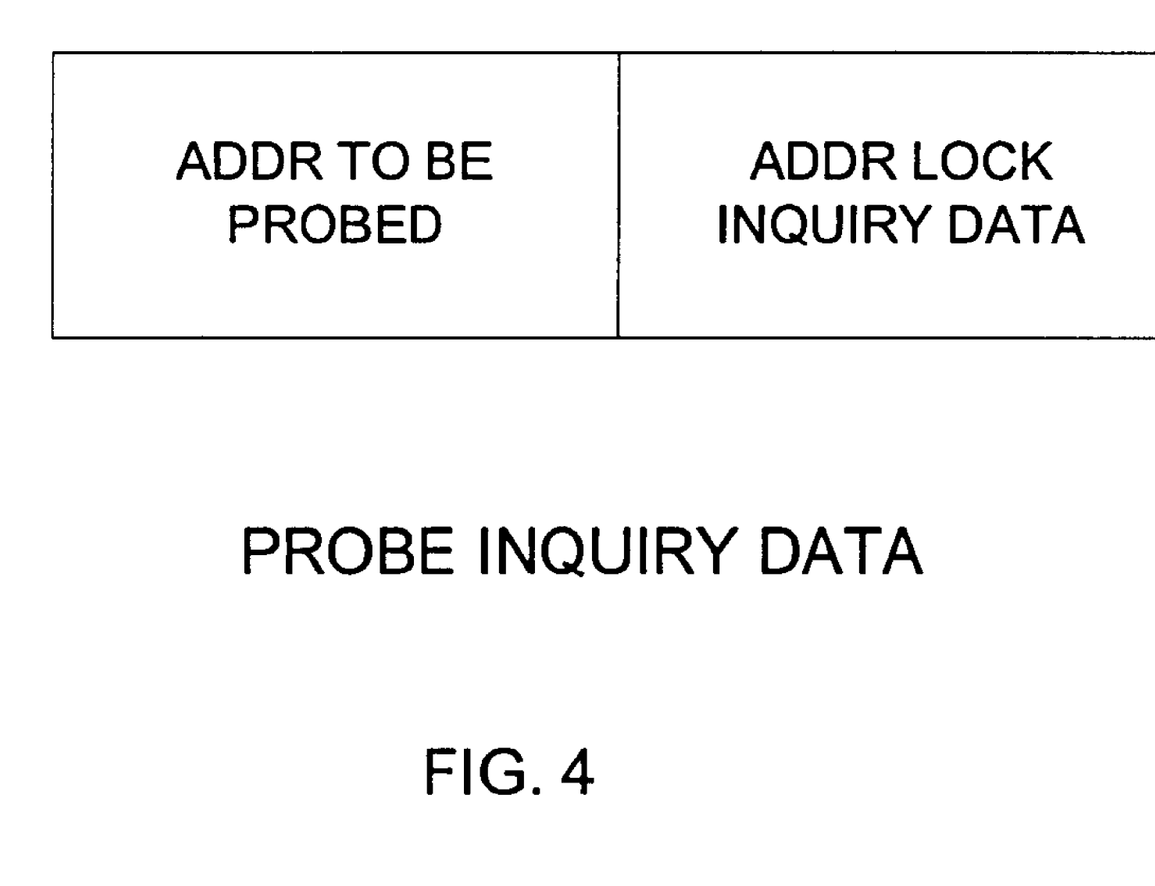
FIG. 4 is a graphic illustration depicting one example of probe inquiry data used to reserve addresses in accordance with one embodiment of the invention.
Figure 5:
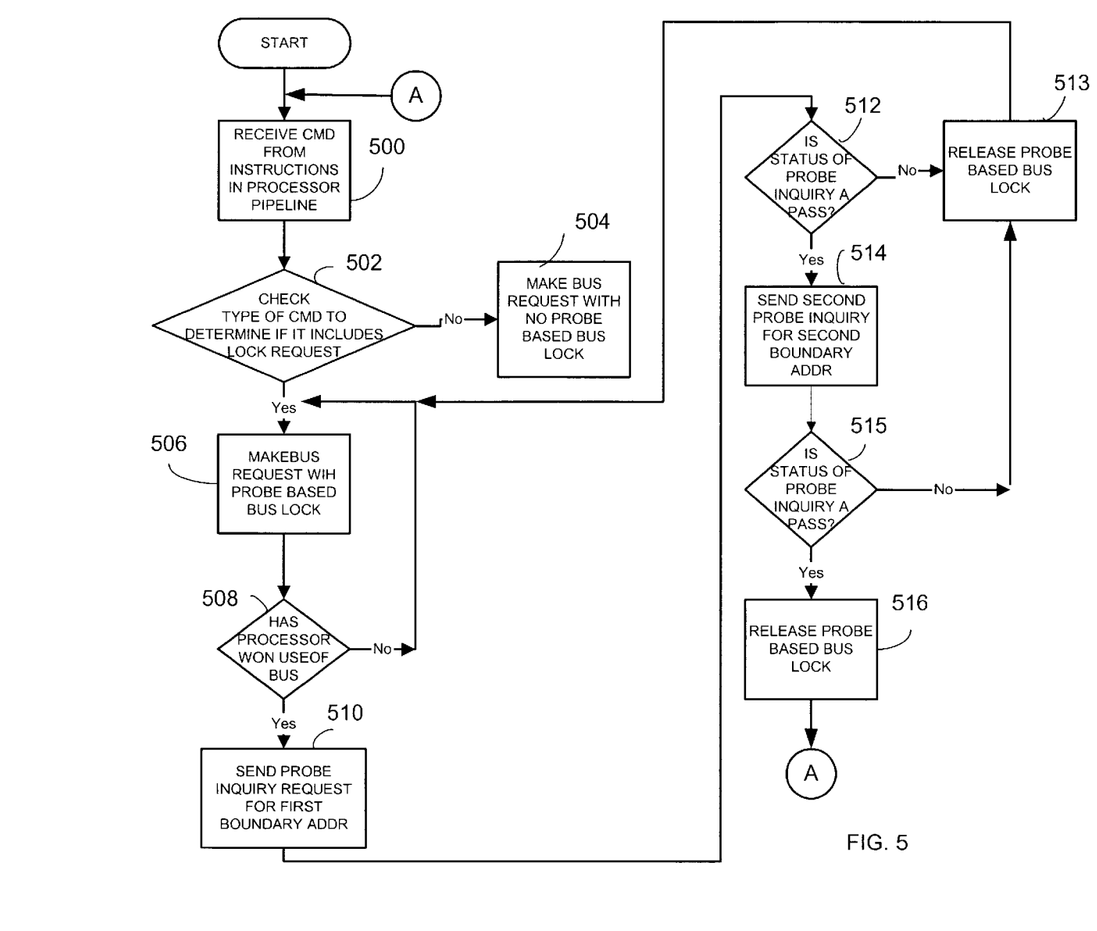
FIG. 5 is a flow chart depicting one example of the operation of bus request logic with probe-based bus lock and address locking in accordance with one embodiment of the invention.

As shown in FIGS. 3 and 4, probe inquiry data 19 may include data representing the address to be probed 400 as well as the address lock inquiry data 402, indicating, for example, whether the address is available. The probe inquiry data 19 in effect asks another processor whether another processor is going to lock another address or if the address is not being used.

FIG. 3 illustrates one example of the probe based bus lock and address lock control logic 22 which in this example, includes arbitration logic 30a with probe based bus lock arbitration, snoop logic 32a with probe failure detection, and bus request logic 34a with probe based bus lock and address locking, and an instruction cache 36, if desired.

The arbitration logic 30a performs some standard arbitration among a plurality of requests to grant a particular device access to the bus. For example, the arbitration may receive requests from the plurality of processors, memory response data, I/O response data, an I/O request and the data for the request itself, but unlike conventional arbiters, also responds to probe-based bus lock data and probe based bus lock request 40. The other processors have the same components indicated as 30n–34n.

Referring to FIGS. 3, 5, 6 and 7, the operation of the probe based bus lock and address lock control logic will be described. Starting with FIG. 5, the bus request logic performs the address-based bus locking. As shown in block 500, the bus request logic receives a command from, for example, an instruction cache. As shown in block 502, bus request logic checks the type of command to determine whether it has the probe inquiry data embedded in the command. If there is no probe inquiry data, the bus request logic makes the bus request with no probe based bus locking as shown in block 504. However, if the instruction includes probe inquiry data 19, as shown in block 506, the bus request logic generates probe based bus lock request 40 for the arbiter indicating that a bus lock is desired. As shown in block 508, the bus request logic determines whether the asking processor has won use of the bus. If not, the bus request logic again makes a probe based bus lock request indicating that it wishes to lock the bus. As shown in block 510, the bus request logic also sends the probe inquiry data 19 for the first boundary address after a bus lock has been instituted. As shown in block 512, the snoop logic of the other processor determines whether the probe address is available. If not available, the snoop logic sends probe failure data 41 for the inquiring processor. If the probe based address lock was not accepted, the processor releases the probe based bus lock as shown in block 513 and makes another request for a bus lock. However, if the probe based address lock is granted, the bus request logic sends the second probe inquiry request for the second boundary address as shown in block 514. The bus request logic again releases the probe based bus lock in response to whether the probe inquiry has passed or failed, as indicated in block 516.

Figure 6:
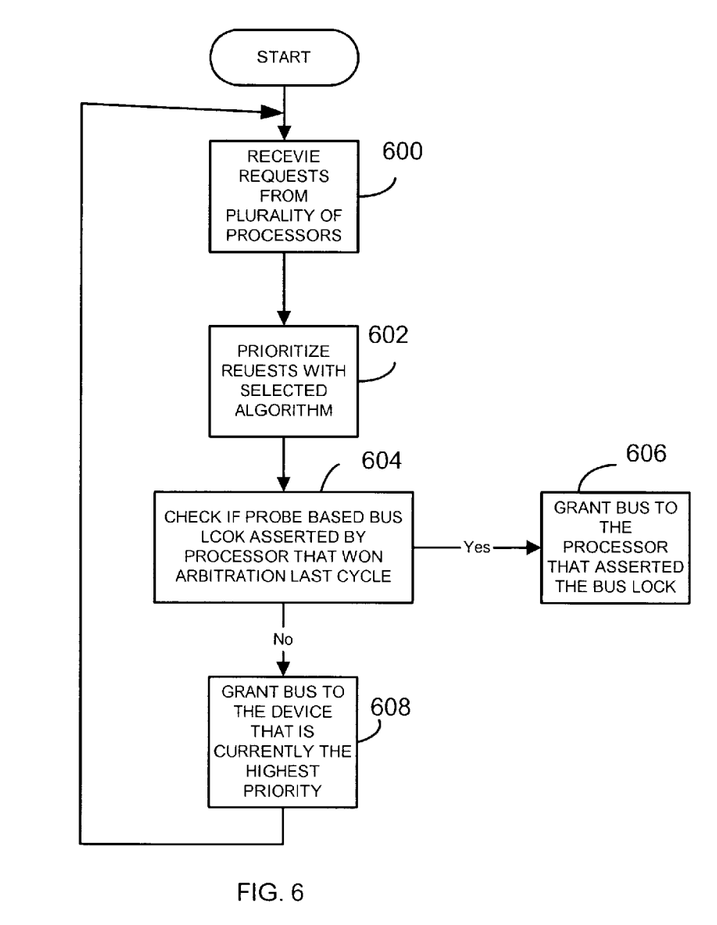
FIG. 6 is a flow chart depicting the operation of arbitration logic with probe-based bus lock arbitration in accordance with one embodiment of the invention.

As shown in FIG. 6, the method for facilitating access to shared memory addresses over a common bus includes receiving requests from any or all devices as shown in block 600. This may be received through arbitration logic 30a. As shown in block 602, the process includes prioritizing requests based on a suitable algorithm, such as a round robin algorithm and any other suitable priority based algorithm as known in the art. As shown in block 604, the process includes determining if a probe-based bus lock 40 request had been asserted by a processor that won arbitration in the last cycle. If this is true, the arbiter grants the bus to the processor that asserted the probe-based bus lock request, as shown in block 606. However, if the processor seeking the probe-based bus lock did not win the arbitration, the arbitrator logic grants the bus to the device that is currently the highest priority as shown in block 608. As such, the probe-based bus arbitration logic receives the probe-based bus logic request and generates the bus lock grant data 42 based on an arbitration of incoming requests.

Figure 7:
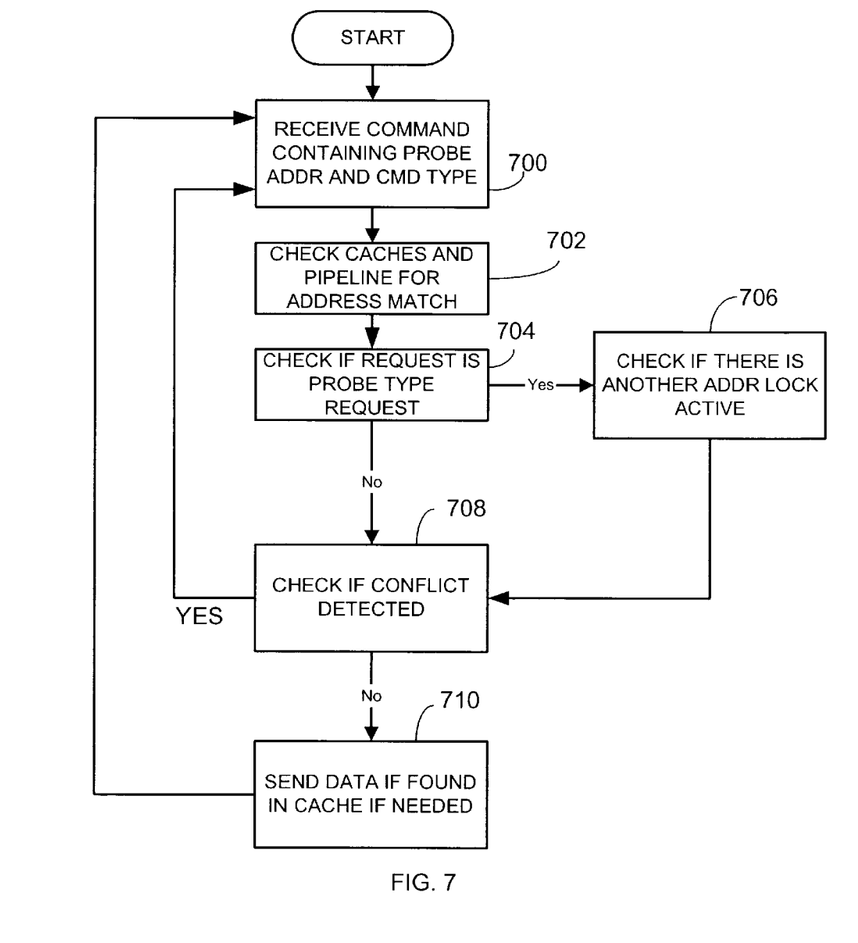
FIG. 7 is a flow chart illustrating one example of the operation of snoop logic with probe failure detection in accordance with one embodiment of the invention.

FIG. 7 illustrates one example of the method and apparatus for facilitating access to shared memory address over a common bus that includes receiving a command that is a probe inquiry type command containing the probe inquiry data 19. This is shown in block 700. Accordingly, when the snoop logic from another processor determines that the probed address is unavailable, the other processor generates probe inquiry fail data in response to the address probe inquiry data based on determining whether the probed address is available for the requesting processor. As shown in block 702, the process includes checking the processor cache and the pipeline for an address match to determine whether the boundary address being probed is going to be used or is in use by a processor. As shown in block 704, the process includes determining whether the request is a probe request, namely, whether the request includes probe inquiry data. As shown in block 706, if the request includes the probe inquiry data 19, the process includes determining if there is another address lock that is active. If there is another address lock active for those addresses (or address) indicated in the probe inquiry data, the process includes checking if the conflict is detected, as shown in block 708. If the conflict is detected, the snoop logic then evaluates the next request. However, if no conflict is detected, then the snoop logic sends the data, if found in the cache, as shown in block 710. For a non-probe command type, a retry is sent when the other processor cannot service the command. Hit data is sent to indicate that a processor will provide requested data. As shown in block 712, the probe failure data is generated indicating that there is a conflict. The bus request logic then uses the probe failure indication to remove the bus lock.

By way of example, the apparatus of FIG. 1 may operate on a 7-stage pipeline scheme wherein the first cycle is used for arbitration. If a probe based bus lock request is received by the arbiter, the arbitrator indicates that the bus must be locked. The lock is performed until both addresses are locked. The arbitration may be performed in any suitable fashion including, for example, a round robin fashion. A second bus cycle may be used, for example, to carry out address and command evaluation. In this cycle, the system determines whether a command includes probe inquiry data. The third cycle may be used as a type of snoop cycle, wherein each processor evaluates its instruction cache to see if the address received from the previous cycle is part of the cache.

A fourth cycle is used as a status cycle wherein each processor indicates whether there has been a hit, meaning that the address is in the cache, or indicates a retry to look at the cache later, or in the case of a probe request to indicate a probe failure for the boundary address.

A fifth cycle is used as a read cycle wherein if there is a hit, and if there is no failure, the address stored in the cache is read. In the sixth state of the pipeline, the processor operates to send data to the processor that started the operation. In the seventh stage of the pipeline, the processor asking for the address pulls the information off the bus. However, any suitable pipeline instruction scheme may be used.

It will be recognized that although the embodiment described indicates sending probe inquiries separately for an address on either side of an address boundary, that both addresses on either side of the boundary can be sent in one inquiry command, if desired. In addition, if desired, the boundary addresses may be stored in any suitable memory as reserved addresses for the first processor in response to receiving address probe inquiry data. That is, when a processor receives the probe inquiry data it may store the probed address to set it aside knowing that another processor is intending to use the address. In addition, the method and apparatus may unlock an address lock in response to an address unlock instruction that may be generated, for example, by the system generating an unlock instruction to notify other processors that the addresses are again available.

The address probe inquiry data 19 may include data representing the address to be probed and may also include data representing an inquiry as to whether the address to be probed is available for future use by the processor generating the probe inquiry. In other words, data indicating that no other processor is going to lock the address or that the address is not being used by other processors. Also, in one embodiment, the address probe inquiry data for each of the two boundary addresses may include first generating an address probe inquiry for one boundary address and subsequently generating another address probe inquiry for another boundary address, or generating a single address probe inquiry for both addresses. In addition, it will be recognized that since each processor may include the probe based bus locking and address locking logic, that the steps described herein may be performed by each of the respective processors as required.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for facilitating access to shared memory addresses over a common bus by a plurality of data processors comprising the steps of:
    detecting, by at least a first data processor, that two access addresses are boundary addresses on either side of an address boundary;
    locking the common bus in response to detecting the two access addresses; and
    locking the two detected access addresses based on address probe inquiry data communicated by the first processor to at least a second processor.

2. The method of claim 1 including the step of generating, by the first data processor, the address probe inquiry data for each of the two detected addresses on either side of the address boundary, wherein the address probe inquiry data includes data representing an inquiry for the second data processor of whether at least one of the two boundary addresses for the first processor of a boundary address can be available for the first processor.

3. The method of claim 2 including the step of removing the bus lock when the address lock is achieved for both boundary addresses.

4. The method of claim 1 including the step of stalling an instruction pipeline of the second data processor, under control of the first processor, in response to locking the bus.

5. The method of claim 2 including the step of storing, for the second processor, the boundary addresses as reserved addresses for the first processor, in response to receiving address probe inquiry data.

6. The method claim 2 including the step of unlocking the address lock in response to an address unlock instruction.

7. The method of claim 2 wherein the address probe inquiry data includes data representing an address to be probed and data representing an inquiry as to whether the address to be probed is available for future use by the first processor.

8. The method of claim 2 including the step of generating, by the second processor, probe inquiry fail data in response to the address probe inquiry data based on determining whether a probed address is available for the first data processor.

9. The method of claim 2 wherein the step of generating the address probe inquiry data for each of the two boundary addresses includes first generating an address probe inquiry for one boundary address and subsequently generating another address probe inquiry for the other boundary address.

10. The method of claim 1 wherein the at least second data processor performs the steps performed by the first processor and wherein the first processor performs the steps of the second processor.

11. A method for facilitating access to shared memory addresses over a common bus by a plurality of data processors comprising the steps of:
    detecting, by at least a first data processor, that two access addresses are boundary addresses on either side of an address boundary;
    locking the common bus in response to detecting the two access addresses;
    generating, by the first processor, address probe inquiry data for at least one of the boundary addresses wherein the address probe inquiry data includes data representing an address to be probed and data representing an inquiry as to whether the address to be probed is available for future use by the first processor;
    locking the two detected access addresses based on the address probe inquiry data communicated by the first processor to at least a second processor; and
    removing the bus lock when the address lock is achieved for both boundary addresses.

12. The method of claim 11 wherein the step of generating, by the first data processor, includes generating the address probe inquiry data for each of the two detected addresses on either side of the address boundary, and wherein the address probe inquiry data includes data representing an inquiry for the second data processor of whether at least one of the two boundary addresses for the first processor of a boundary address can be available for the first processor.

13. The method of claim 11 including the step of stalling an instruction pipeline of the second data processor, under control of the first processor, in response to locking the bus.

14. The method of claim 12 including the step of storing, for the second processor, the boundary addresses as reserved addresses for the first processor, in response to receiving address probe inquiry data.

15. The method claim 12 including the step of unlocking the address lock in response to an address unlock instruction.

16. The method of claim 12 including the step of generating, by the second processor, probe inquiry fail data in response to the address probe inquiry data based on determining whether a probed address is available for the first data processor.

17. The method of claim 16 wherein the step of generating the address probe inquiry data for each of the two boundary addresses includes first generating an address probe inquiry for one boundary address and subsequently generating another address probe inquiry for the other boundary address.

18. The method of claim 11 wherein the at least second data processor performs the steps performed by the first processor and wherein the first processor performs the steps of the second processor.

19. An apparatus for facilitating access to shared memory addresses over a common bus by a plurality of data processors comprising:
    means for detecting that two access addresses are boundary addresses on either side of an address boundary;
    means for locking the common bus in response to detecting the two access addresses; and
    means for locking the two detected access addresses based on address probe inquiry data communicated by the first processor to at least a second processor.

20. The apparatus of claim 19 including means for generating the address probe inquiry data for each of the two detected addresses on either side of the address boundary, wherein the address probe inquiry data includes data representing an inquiry for the second data processor of whether at least one of the two boundary addresses for the first processor of a boundary address can be available for the first processor.

21. The apparatus of claim 20 including means for removing the bus lock when the address lock is achieved for both boundary addresses.

22. The apparatus of claim 19 including the step of stalling an instruction pipeline of the second data processor, under control of the first processor, in response to locking the bus.

23. The apparatus of claim 20 including the step of storing, for the second processor, the boundary addresses as reserved addresses for the first processor, in response to receiving address probe inquiry data.

24. The apparatus claim 20 including the step of unlocking the address lock in response to an address unlock instruction.

25. The apparatus of claim 20 wherein the address probe inquiry data includes data representing an address to be probed and data representing an inquiry as to whether the address to be probed is available for future use by the first processor.

26. The apparatus of claim 20 including the step of generating, by the second processor, probe inquiry fail data in response to the address probe inquiry data based on determining whether a probed address is available for the first data processor.

27. The apparatus of claim 20 wherein the step of generating the address probe inquiry data for each of the two boundary addresses includes first generating an address probe inquiry for one boundary address and subsequently generating another address probe inquiry for the other boundary address.

28. The apparatus of claim 19 wherein the at least second data processor performs the steps performed by the first processor and wherein the first processor performs the steps of the second processor.

\* \* \* \* \*